SIGNAL DETECTION CIRCUIT

Filed Dec. 21, 1964 3 Sheets-Sheet 1

INVENTOR.
JAMES H. COLBURN
LELAND J. HANCHETT, JR.
BY Samuel E. Turner
ATTORNEY

SIGNAL DETECTION CIRCUIT

Filed Dec. 21, 1964

3 Sheets-Sheet 3

3,348,201
SIGNAL DETECTION CIRCUIT
James H. Colburn, Los Altos, Calif., and Leland J. Hanchett, Jr., Phoenix, Ariz., assignors to General Electric Company, a corporation of New York
Filed Dec. 21, 1964, Ser. No. 419,882
8 Claims. (Cl. 340—146.3)

This invention relates to a signal detection circuit and particularly to a signal preprocessing circuit for indicating the occurrence of a desired electrical signal in the presence of extraneous electrical or noise signals and even though the desired signal is distorted from its ideal form.

There are numerous applications in the electronics art that involve the detection of low-level signals in the presence of noise signals and wherein the desired signal may be distorted by such noise signals and/or other conditions. An example of such an application is in the field of automatic character recognition wherein characters to be read are printed in magnetic ink.

For example, in one version of an automatic reading system, documents bearing human language symbols printed with a magnetizable ink are translated in sequence past a reading station whereat each symbol is first magnetized with an alternating current magnetizing signal. Each magnetized symbol then passes adjacent a segmented or multichannel reading transducer, the output channels of which are periodically sampled in timed relation to the passage of each magnetized symbol. In this manner a two-dimensional scanning of the symbol is achieved and a two-dimensional pattern of signals, which is unique for each symbol, is produced. Recognition circuitry is provided to receive these signal patterns and to identify the corresponding symbols therefrom.

Many difficulties are encountered in the printing and detection of magnetic symbols. The layer of magnetic ink with which a symbol is printed is relatively thin, thus the signals induced in each channel of a multichannel reading transducer are of relatively low level making the system susceptible to noise signals of various types.

It will also be appreciated that the printed symbols inevitably vary from their ideal form including variations in the thickness of the magnetic ink, voids in the printed areas, variations in the widths and nonuniformity of the edges of printed areas, and misalignment of the symbol with respect to the document. These variations can cause erroneous signals as well as voids in the signal pattern.

It is also found that documents become spattered with ink particles during the printing process and that magnetic wastes such as iron particles become imbedded in the documents when they are manufactured. Such extraneous magnetic particles cause corresponding spurious signals in the reading transducer.

It is an object of the present invention to alleviate the above-outlined difficulties by providing a signal preprocessing and detection circuit which will correctly detect the occurrence of a desired signal even though it is distorted and accompanied by noise signals.

It is a further object of the invention to detect the occurrence of a desired signal in the presence of noise signals.

It is another object of the invention to reject high-amplitude spurious signals of short duration.

These and other objects of the invention are achieved in a symbol reading system, for example, by providing a signal preprocessing and detection circuit for receiving and detecting symbol signals from each channel of the multichannel reading transducer.

The preprocessing and detection circuit of the invention comprises a full-wave rectifier circuit for rectifying the signals from the transducer, an integrator circuit for integrating the signal from the rectifier during successive integration intervals, a comparator circuit which compares the output signal from the integrator to a threshold signal and provides a quantized output signal when the signal from the integrator is greater than the threshold signal level, and a digital preprocessor circuit which stores successive output signals from the comparator and provides an output signal indicative of the occurrence of a desired signal in response to signals from the comparator circuit during a predetermined percentage of integration intervals of a predetermined total number of successive integration intervals. A periodic control signal is applied to the integrator and preprocessor circuit. The control signal periodically resets the integrator to establish the time length of each integration period. This control signal also advances or shifts the information stored in the preprocessor.

The employment of an integrator in the signal detection circuit of the invention is based upon the principle that the integrator circuit provides a greater output signal when a desired signal plus noise signals are present than when only noise signals are present.

In the illustrated embodiment of the invention, the period between control signals is selected to be one-third the period of the anticipated desired signal to be detected. Thus, since each control signal resets the integrator, a desired signal is integrated as three successive parts, each of these three integrated parts being separately compared to the threshold signal. Correspondingly, the preprocessor circuit is arranged to provide an output signal indicative of the occurrence of the desired signal when two of the three successively integrated parts are above the threshold level. It is found that this type of operation decreases the probability of error as compared to a single integration over entire period of the desired signal. This type of operation also provides rejection of high-amplitude short-duration spurious signals having periods of less than two of the integration periods.

The invention is described more specifically hereinafter with reference to the accompanying drawings wherein.

Although not restricted to such use, the present invention is described herein in the environment of an automatic symbol reader for reading symbols printed with a magnetizable ink. Thus in FIG. 1 there is shown an enlarged human-language symbol "5" printed with magnetizable ink on a document 10.

The document 10 is translated horizontally to the right (by means not shown) and thus passes adjacent a gap 11 of a magnetizing transducer 12 whereby the magnetic material of the symbol is magnetized with an alternating current signal. The symbol then passes adjacent a multichannel transducer 14 having a plurality of separate transducer elements or channels 15(1)–15(9). Each channel of the multichannel transducer responds to the magnetized magnetic material of the symbol passing adjacent thereto to produce output signals on a plurality of respective lines 16(1)–16(9). The multichannel transducer 14 thus scans a plurality of horizontal zones across the symbol.

Figure 1:
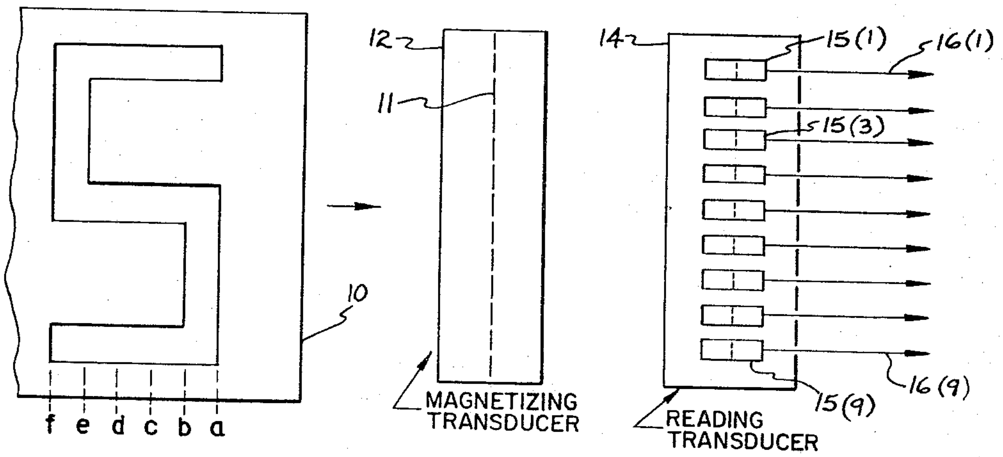
FIGURE 1 is an enlarged view of a symbol printed with magnetic ink together with representations of a magnetizing transducer and a multichannel reading transducer.

As illustrated in FIG. 1, the symbol "5" may be considered as divided into a plurality of vertical zones at a plurality of zone lines *a–f*. In a typical reading system the output signals from the reading transducer 14 are periodically sampled (at some point in the system) between adjacent ones of the vertical zone lines *a–f* to provide horizontal scanning to thus provide a two-dimensional pattern of signals representative of the symbol. For example, in the present case, channels 15(1), 15(5) and 15(9) of the multichannel transducer 14 produce signals for all vertical zones of the symbol "5" while channels 15(2)–15(4) produce signals only in vertical zone *e* to *f* and channels 15(6)–15(8) produce signals only in vertical zone *a* to *b*.

In a typical set of symbols adapted for machine recognition all lines of each symbol are formed of uniform width, for example, .013 inch. In such a case the vertical zones between adjacent ones of the zone lines *a–f* preferably have a width of .013 inch. Since the symbol lines are not always accurately formed during normal printing, it is preferable that the magnetizing signal applied by magnetizing transducer 12 have a frequency to provide a magnetizing wavelength of the symbol in the order of .008 inch. This assures at least a full period signal from each vertical zone of the symbol even though some of the vertical lines or strokes of the symbol are narrower than ideal.

Figure 2:
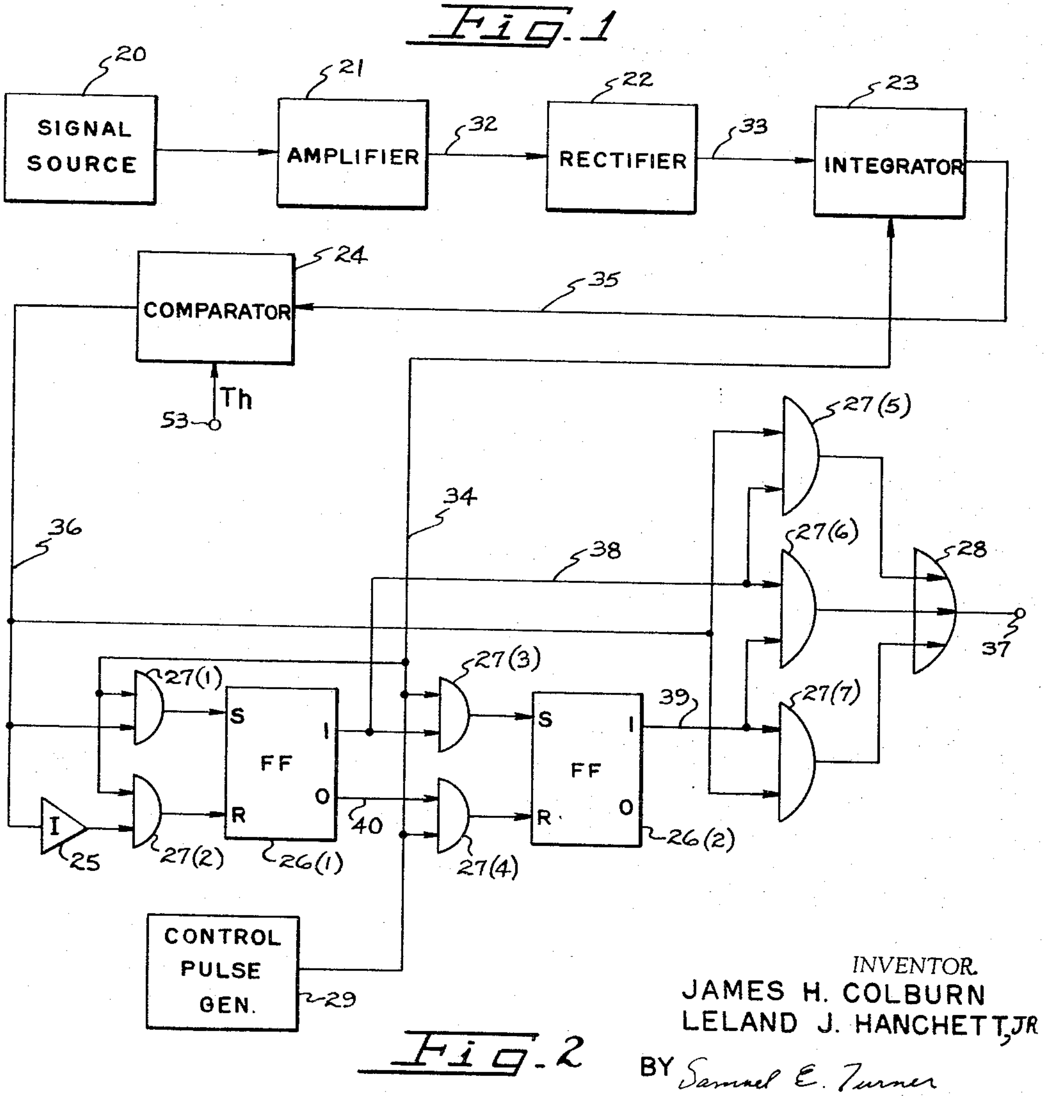
FIGURE 2 is a block diagram of an embodiment of a signal detection and preprocessing circuit according to the invention.

A block diagram of an embodiment of a signal detection and preprocessing circuit of the invention is shown in FIG. 2. In the environment of a symbol reading system, a circuit as shown in FIG. 2 is provided for each of the channels of the multichannel reading transducer 14 of FIG. 1. Thus a signal source 20 of FIG. 2 may be, for example, the transducer element or channel 15(3) of FIG. 1.

The circuit of FIG. 2 comprises the signal source 20, a well-known amplifier 21, a full-wave rectifier 22, an integrator 23, a comparator 24, an inverter 25, a pair of well-known flip-flop circuits 26(1) and 26(2), a plurality of well-known AND gates 27(1)–27(7) and a well-known OR gate 28. Periodic control signals are provided by a control signal source 29 of known type and a threshold signal T*h* is provided at a terminal 53. The threshold signal T*h* is a voltage selected to be slightly above the general level of noise signals as illustrated in FIG. 3.

Operation of the circuit of FIG. 2 will be described with reference to the timing diagram of FIG. 3 which illustrates the waveshapes of various signals which occur during the described example of operation of the circuit. The leads and terminals of FIG. 2 on which these waveshapes appear are given in parentheses to the right in FIG. 3. Waveshape I of FIG. 3 is the amplified waveshape of an ideal signal as would be produced, for example, by the reading transducer channel 15(3) of FIG. 1 in response to an ideal symbol "5" during scanning of the vertical zone *e* to *f* and in the absence of noise or spurious signals.

Figure 3:
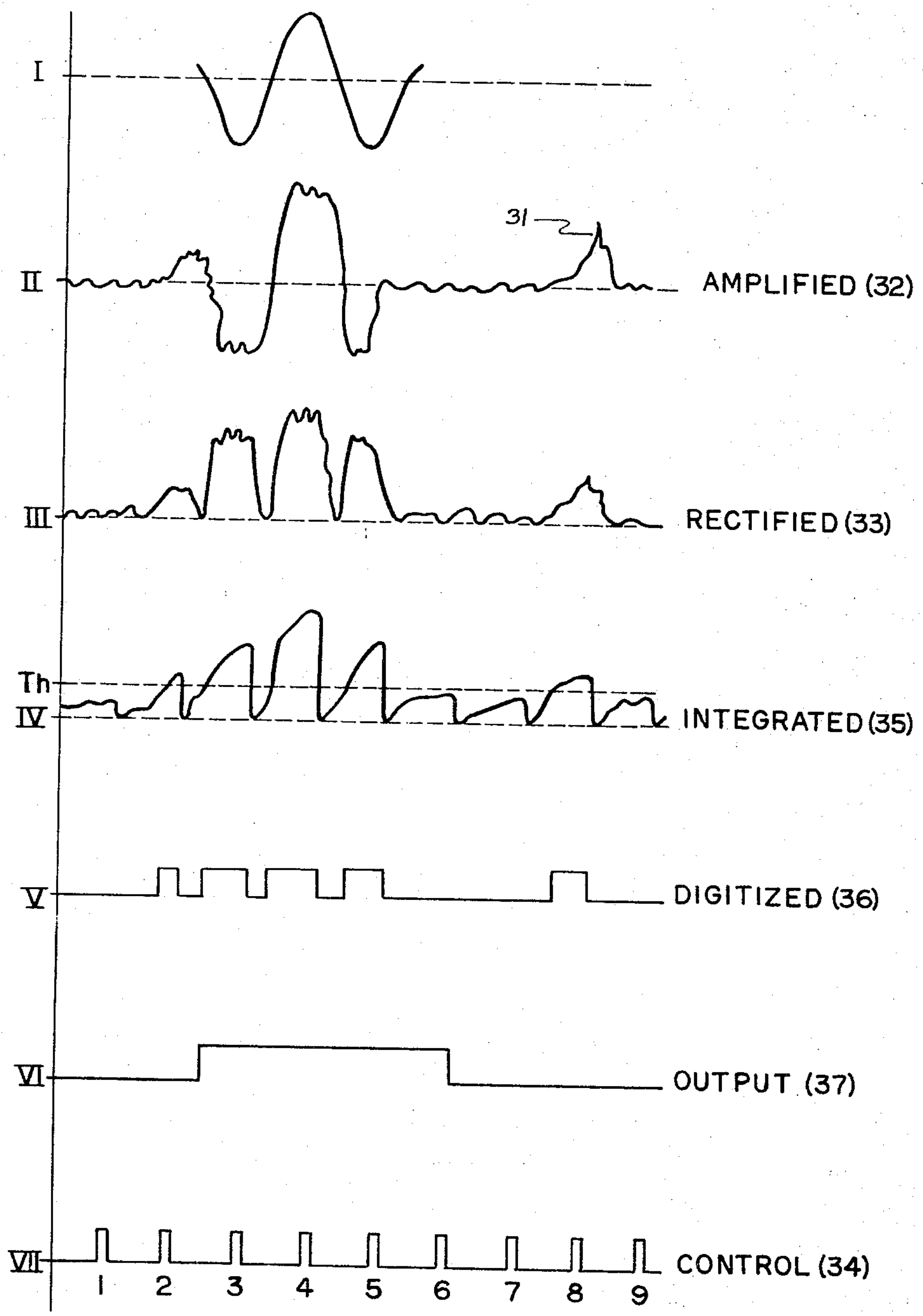
FIGURE 3 is a timing diagram of various waveshapes which occur during an example of operation of the circuit of the invention.

Waveshape II of FIG. 3 is the amplified waveshape of the ideal signal of waveshape I having superimposed thereon noise signals which occur in actual practice for the reasons outlined hereinbefore. Waveshape II also includes a waveshape 31 as an example of a high-amplitude spurious signal as might be produced, for example, from an extraneous magnetic particle. The waveshape II is the output signal of amplifier 21 which is applied to the rectifier 22 on a lead 32.

Waveshape III of FIG. 3 is the full-wave rectified form of the waveshape II. This rectified signal is applied from the rectifier 22 to the integrator 23 on a lead 33.

Waveshape VII illustrates a train of control pulses generated by control signal source 29 and applied to the integrator 23 over a lead 34. Each control pulse operates to reset the integrator 23. As discussed hereinbefore, according to the illustrated embodiment, the frequency of the control pulses is such that a symbol signal from each vertical zone or stroke is integrated three successive times. For example, with a document scanning speed such that a vertical zone or stroke is scanned by the reading transducer 14 in 55.8 microseconds, the period between the pulses of the control pulse train is 18.6 microseconds. For convenience of the present description, the pulses of the illustrated pulse train VII are numbered 1–9.

Waveshape IV is the integrated waveshape which constitutes the output signal of integrator 23. This integrated signal is applied to one input terminal of the comparator 24 over a lead 35. The downward-going vertical portions of this waveshape occurring at the position of each control pulse indicates the resetting of the integrator 23 in synchronism with the control pulses.

At its other input terminal the comparator 24 receives a threshold signal T*h*, as illustrated along with the integrated waveshape IV in FIG. 3. Waveshape V is the digitized output signal of the comparator 24 and, as is seen from the example of FIG. 3, comparator 24 produces an output signal of uniform amplitude whenever the integrated waveshape IV exceeds the threshold signal T*h*. Thus, as illustrated in FIG. 3, the comparator 24 produces output signals in the periods between control pulses 1 and 2, 2 and 3, 3 and 4, 4 and 5, and 7 and 8.

The digitized output signals of waveshape V appear on an output lead 36 from comparator 24 and are applied to a preprocessing circuit which temporarily stores and analyzes these signals. The preprocessing circuit includes flip-flop circuits 26 (1) and 26(2) with respective input AND gates 27(1) and 27(2), and 27(3) and 27(4), each flip-flop circuit having respective set and reset terminals S and R and respective output terminals "1" and "0." The AND gates 27(5)–27(7) and the OR gate 28 comprise a majority logic circuit which produces a detection circuit output signal, indicative of the detection of a desired symbol signal, at an output terminal 37 when signals appear simultaneously on two or more of a plurality of leads 36, 38 and 39. The output signal at terminal 37 is illustrated in FIG. 3 as a waveshape VI.

Operation of the preprocessor circuit for the present example is as follows with reference to FIGS. 2 and 3. It is assumed that the flip-flops 26(1) and 26(2) are initially in their reset states thus producing low or disabling signals on leads 38 and 39. Upon the occurrence of control pulse 1, the waveshape IV is below the threshold signal T*h*. Therefore, the comparator 24 does not produce an output or comparison signal on lead 36. Thus, lead 36 presents a disabling signal to gates 27(1), 27(5) and 27(7). With disabling signals also appearing on leads 38 and 39, no output signal is produced at terminal 37.

Upon the occurrence of control pulse 2, the waveshape IV is above the level of the threshold signal T*h*. The comparator 24 is therefore producing an enabling signal on lead 36 which enables one terminal of each of the gates 27(1), 27(5) and 27(7). Thus in response to the control pulse 2 applied over lead 34 to its other input terminal, the gate 27(1) applies a triggering signal to the set terminal of flip-flop 26(1). This places flip-flop 26(1) in its set state whereby it produces an enabling signal at its "1" output terminal to which the lead 38 is connected. This enabling signal on lead 38 thus enables one terminal of each of the majority logic gates 27(5) and 27(6). However, the gate 27(5) does not produce an output signal at this time due to the fact that the switching time of flip-flop 26(1) is such that the integrator 23 is reset by control pulse 2 and the comparison signal on lead 36 therefore falls to a disabling level before the signal on lead 38 reaches the enabling level. Therefore no output signal is produced by gate 27(5) or at the output terminal 37.

Between control signals 2 and 3, the integrated waveshape again rises above the threshold level whereby the comparator 24 produces an enabling signal on lead 36. With enabling signals on both leads 36 and 38, the gate 27(5) is fully enabled to produced a detection circuit output signal at terminal 37.

Upon the occurrence of control pulse 3 on lead 34, enabling signals are present on leads 36 and 38. Thus, the flip-flop 26(1) again receives a triggering signal at its set input terminal from gate 27(1). However, it is already in its set state where it thus remains. The gate 27(3) is enabled by the enabling signal on lead 38. Thus upon receipt of the control pulse 3 on the lead 34 to its other terminal, the gate 27(3) produces a triggering signal at the set input terminal of flip-flop 26(2). Thus flip-flop 26(2) assumes its set state to produce an enabling signal on lead 39 connected to input terminals of majority logic gates 27(6) and 27(7).

During the period between control pulse 3 and control pulse 6, the flip-flops 26(1) and 26(2) both remain in their set states. Enabling signals thus remain on leads 38 and 39 and an output signal on terminal 37 continues to be produced as indicated by waveshape VI. However, upon the occurrence of control pulse 6, the integrated waveshape IV is below the threshold signal T*h*. Therefore, the comparator 24 is producing a disabling signal on lead 36. This disabling signal is inverted by inverter 25 to become an enabling signal at an input terminal of gate 27(2). This is response to the control pulse 6 applied to its other input terminal on lead 34, the gate 27(2) produces a triggering signal which is applied to the reset terminal of flip-flop 26(1). The flip-flop 26(1) thus assumes its reset state and the signal on lead 38 falls to a disabling level. With signals on both leads 36 and 38 at a disabling level, the majority logic circuit no longer produces an output signal at the terminal 37.

Upon the occurrence of control pulse 7 an enabling signal is present on a lead 40 between the "0" output terminal of flip-flop 26(1) and one terminal of input AND gate 27(4). Thus, in response to control pulse 7 at its other input terminal, the gate 27(4) produces a triggering signal which resets flip-flop 26(2). Both flip-flops 26(1) and 26(2) are now in their reset states.

Between control pulses 7 and 8, the integrated waveshape IV again rises above the threshold level due to the spurious signal 31. Thus, upon the occurrence of control pulse 8, the comparator is producing an enabling signal on lead 36. In response to this enabling signal and the control pulse 8, the gate 27(1) produces a triggering signal which sets the flip-flop 26(1). However, because of the short duration of the spurious signal 31, the integrated waveshape does not exceed the threshold level between control pulses 8 and 9. Thus, the signal on lead 36 from comparator 24 remains at a disabling level during this period and no output signal is produced at terminal 37. In this way the circuit discriminates against short-duration high-amplitude signals such as spurious signal 31. Thus, upon the occurrence of control pulse 9, the flip-flop 26(1) is again reset through inverter 25 and gate 27(2).

Thus, the above-described embodiment of the invention provides for three successive integrations over a time interval substantially equal to the period of a desired signal and requires as a condition for an indication of the detection of the desired signal that two of the three integrated portions be above a threshold level. However, the number of successive integrations and the two-out-of-three logic requirement is not a limitation of the invention and it is contemplated that the invention can be extended, for example, to a system wherein five successive integrations are performed over the period of the desired signal with, for example, a three-out-of-five majority logic requirement. As another or additional alternative, it may be desirable to provide an output signal only if all of a successive predetermined plurality of successively integrated portions are above the threshold level. For example, if the gate 27(7) (FIG. 2) is omitted, an output signal is produced at terminal 37 only if two successively integrated portions are above the threshold signal.

Figure 4:
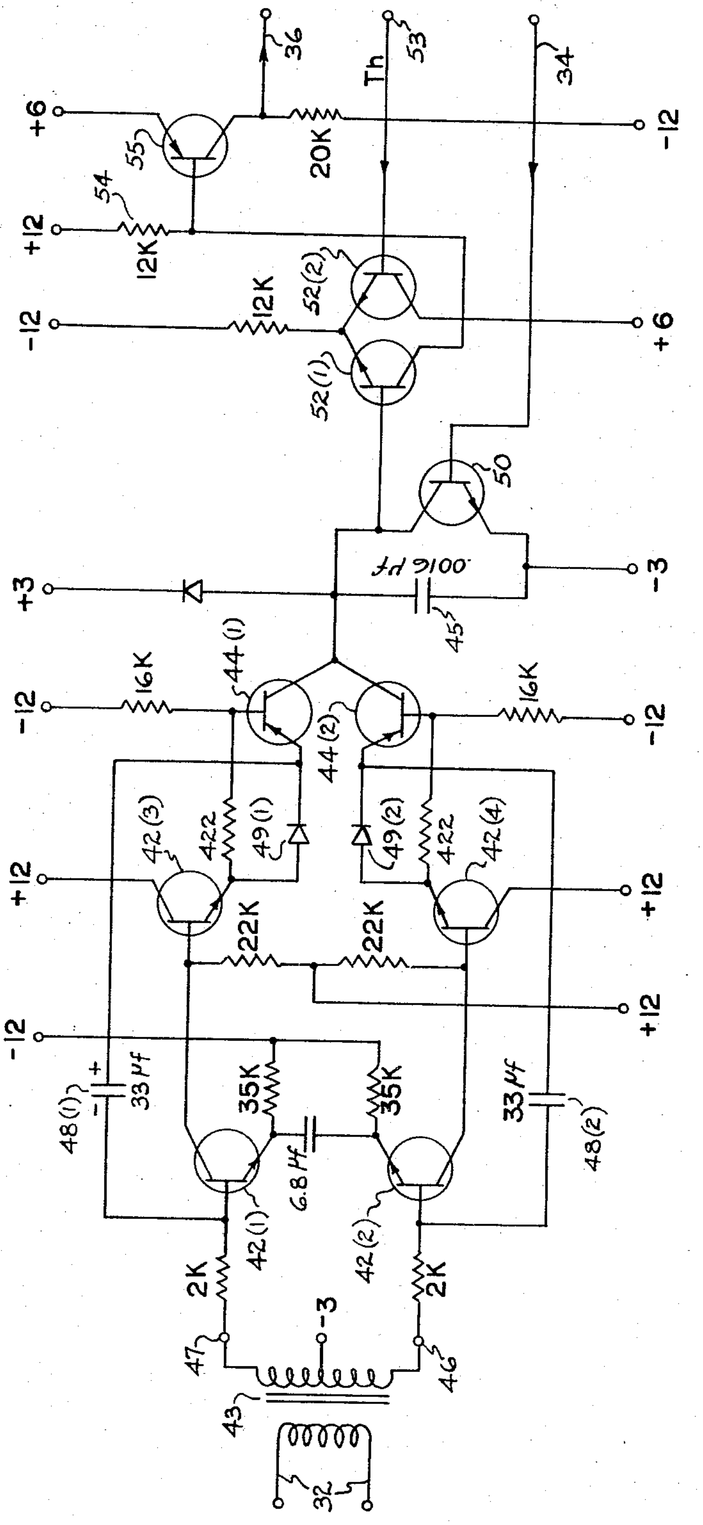
FIGURE 4 is a schematic diagram of suitable embodiments of a full-wave rectifier circuit, an integrator circuit and a comparator circuit.

Shown in FIG. 4 is a schematic diagram of a circuit which performs the functions of the rectifier 22, the integrator 23 and the comparator 24 of FIG. 2.

A plurality of transistors 42(1)–42(4) are connected in a balanced operational amplifier circuit which receives input signals via a transformer 43 the primary winding of which is connected to the lead 32 from amplifier 21 of FIG. 2. This balanced amplifier, comprising transistors 42(1)–42(4), provides currents to a full-wave rectifier circuit formed by a pair of transistors 44(1) and 44(2), the collectors of which are connected to one end of a capacitor 45 which serves as the integrator 23 (FIG. 2), the other end of integrating capacitor 45 being connected to a reference voltage source.

Operation of the amplifier-rectifier circuit of FIG. 4 is illustrated as follows: Assume that an input signal is received such that the voltage at a terminal 46 of transformer 43 becomes positive and the voltage at a terminal 47 becomes negative. The voltage at the base of transistor 42(2) thus becomes positive and the voltage at the emitter of transistor 42(4) becomes negative. Thus, a charging current flows through a capacitor 48(2), connected between the base of transistor 42(2) and the emitter of rectifying transistor 44(2), and into the integrating capacitor 45. Meanwhile the negative voltage at transformer terminal 47 causes a current flow from the emitter of transistor 42(3) through a diode 49(1) and into a capacitor 48(1) which is thereby discharged.

On the next half cycle of the input signal the voltage at terminal 46 becomes negative and the voltage at terminal 47 becomes positive. The integrating capacitor now receives its current through capacitor 48(1) and transistor 44(1) while capacitor 48(2) is discharged by a current through a diode 49(2). The above-described rectifier arrangement has the advantage of providing improved linearity of rectification.

A transistor 50 provides a controlled discharge path for the integrating capacitor 45 by which the integrator is periodically reset in response to control pulses from control signal source 29 (FIG. 2) on lead 34 which is connected to the base of transistor 50. The positive control pulse thus applied to the base of transistor 50 causes it to conduct, thus discharging the integrating capacitor 45.

A pair of transistors 52(1) and 52(2) form the comparator circuit 24 of FIG. 2. The voltage on the integrating capacitor 45 is applied to the base of transistor 52(1) while the threshold signal T*h* is received at a terminal 53 and is applied to the base of transistor 52(2). Quantized output signals are taken from the collector of transistor 52(1) across a collector resistor 54 and are applied to the base of a transistor 55 which functions as an inverter to provide positive going output signals on lead 36 to the preprocessor and majority logic circuits of FIG. 2.

Thus, when the threshold signal T*h* is above the voltage on the integrating capacitor 45, the transistor 52(2) is conducting and the comparator output signal at the collector of transistor 55 on lead 36 is at a disabling level. However, when the voltage on the integrating capacitor 45 exceeds the threshold voltage T*h*, conduction of the comparator transistors switches with transistor 52(1) now conducting and transistor 52(2) cut off, thus providing an enabling signal on lead 36.

Thus what has been described is a signal preprocessing and analyzing circuit providing successive integrations of a received signal with the requirement that a majority of a successive predetermined plurality of successively integrated signals exceed a threshold signal before an output signal indicative of a detected desired signal is produced whereby the occurrence of a desired signal may be detected in the presence of noise signals and distortion and whereby short-duration spurious signals are rejected.

While the principles of the invention have been made clear in the illustrative embodiments, there will be obvious to those skilled in the art, many modifications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A signal detection circuit for detecting a signal having a predetermined normal time of occurrence comprising: means for receiving a signal to be detected; means for integrating a plurality of successive portions of said signal to be detected during said normal time of occurrence of said signal; means providing a threshold signal; and comparison and analyzing means for producing an output signal indicative of the occurrence of said signal to be detected when a majority of a successive predetermined plurality of successively integrated portions of said signal to be detected exceed said threshold signal.

2. A signal detection circuit for detecting a signal having a predetermined normal time of occurrence, comprising: means for receiving a signal to be detected; means for integrating a plurality of successive portions of said signal to be detected during said normal time of occurrence of said signal; means providing a threshold signal; comparator means for comparing the integrated signal from each of said successive portions with said threshold signal and for producing a comparison signal when said integrated signal exceeds said threshold signal; and analyzing means for receiving comparison signals from said comparator means and for producing an output signal indicative of the occurrence of said signal to be detected when at least a predetermined number of a successive predetermined plurality of successively integrated portions of said signal to be detected exceed said threshold signal.

3. A signal detection circuit for detecting a signal having a predetermined normal time of occurrence, comprising: integrator means for receiving a signal to be detected, said integrator means providing an integrated signal during each of a plurality of successive time intervals during said normal time of occurrence of said signal; means providing a threshold signal; and processing means for receiving said threshold signal and the integrated signals from said integrator means, said processing means producing an output signal indicative of the occurrence of said signal to be detected when at least a predetermined number of the successive integrated signals of a predetermined plurality of said successive time intervals exceed said threshold signal.

4. A signal detection circuit for detecting a signal having a predetermined normal time of occurrence comprising: integrator means for receiving a signal to be detected, said integrator means providing an integrated signal in response to a received signal during each of a plurality of successive time intervals during said normal time of occurrence of said signal; means providing a threshold signal, comparator means for comparing the integrated signals from said integrator means with said threshold signal and for producing a comparison signal when the level of said integrated signal is above the level of said threshold signal; and means responsive to said comparison signals for producing an output signal indicative of said signal to be detected upon the receipt of a comparison signal during a majority of a successive predetermined plurality of said successive time intervals.

5. A signal detection circuit comprising: a rectifier circuit for receiving input signals including an alternating current signal to be detected, said signal having a predetermined normal time of occurrence; an integrator circuit for receiving rectified signals from said rectifier circuit, means for resetting said integrator circuit at the end of a plurality of successive time intervals during said normal time of occurrence of said signal; means providing a threshold signal; a comparator circuit for receiving said threshold signal and the integrated signals from said integrator circuit, said comparator circuit producing a comparison signal whenever the received integrated signal is greater than said threshold signal; and means producing an output signal in response to the occurrence of said comparison signal during a majority of a successive predetermined plurality of said time intervals.

6. In a symbol reading system for recognizing symbols printed on documents with a magnetizable ink, said system including alternating current magnetizing means for magnetizing the ink if said symbols and a multichannel reading transducer responsive to the passage of said magnetized ink adjacent thereto for scanning said symbols for producing signals in each of the channels of said reading transducer, a plurality of signal detection circuits each connected to receive scanning signals from a respective one of said channels, each of said detection circuits comprising: integrator means for receiving said scanning signals, said integrator means providing an integrated signal during each of a plurality of successive time intervals during the passage of each vertical zone of said symbol past said transducer; means providing a threshold signal; and means jointly responsive to said integrated signal and said threshold signal for producing an output signal when at least a predetermined number of the integrated signals of a successive predetermined plurality of said successive time intervals exceeds said threshold signal.

7. A signal detection circuit having a predetermined normal time of occurrence comprising: integrator means for receiving a signal to be detected and for providing an integrated signal in response thereto; means for resetting said integrator means at the end of each of a plurality of successive time intervals during said normal time of occurrence of said signal; means providing a threshold signal; comparator means for comparing said integrated signal with said threshold signal and for producing a comparison signal when said integrated signal exceeds said threshold signal; a plural stage shift register connected to receive comparison signals from said comparator means; means for shifting said register in synchronism with the resetting of said integrator means; and a majority logic circuit connected to receive signals from said comparator means and from each stage of said shift register, said logic circuit being operable to produce an output signal indicative of said signal to be detected when the received signals satisfy the logic requirement of said logic circuit.

8. A signal detection circuit for detecting a signal having a predetermined normal time of occurrence, comprising: integration means for receiving said signal and for producing an integrated signal, said integration means providing a predetermined plurality of successive integration periods during a time interval substantially equal to said normal time of occurrence of said signal; and analyzing circuit for receiving said integrated signals and for producing an output signal when an integrated signal greater than a predetermined amplitude is received during at least a predetermined number of said plurality of successive integration periods.

References Cited

UNITED STATES PATENTS

| | | | |
|---|---|---|---|
| 3,096,506 | 7/1963 | Chow et al. | 340—146.3 |
| 3,160,853 | 12/1964 | Howard | 340—146.3 |
| 3,165,717 | 1/1965 | Eckelman et al. | 340—146.3 |
| 3,167,742 | 1/1965 | Miller | 340—146.3 |

DARYL W. COOK, *Acting Primary Examiner.*

J. I. SCHNEIDER, *Assistant Examiner.*